US006973190B1

(12) United States Patent
Goubin

(10) Patent No.: US 6,973,190 B1
(45) Date of Patent: Dec. 6, 2005

(54) METHOD FOR PROTECTING AN ELECTRONIC SYSTEM WITH MODULAR EXPONENTIATION-BASED CRYPTOGRAPHY AGAINST ATTACKS BY PHYSICAL ANALYSIS

(75) Inventor: Louis Goubin, Paris (FR)

(73) Assignee: CP8 Technologies, Paris (FR)

( * ) Notice: Subject to any disclaimer, the term of this patent is extended or adjusted under 35 U.S.C. 154(b) by 590 days.

(21) Appl. No.: 09/869,435

(22) PCT Filed: Oct. 26, 2000

(86) PCT No.: PCT/FR00/02978

§ 371 (c)(1), (2), (4) Date: Jun. 28, 2001

(87) PCT Pub. No.: WO01/31436

PCT Pub. Date: May 3, 2001

(30) Foreign Application Priority Data

Oct. 28, 1999 (FR) .................................. 99 13507

(51) Int. Cl.[7] ............................................... G06F 11/30
(52) U.S. Cl. ........................... 380/263; 380/37; 380/38
(58) Field of Search ............................... 380/268, 282, 380/285.44, 28–30, 263.42, 37–38, 46; 713/200, 713/201

(56) References Cited

U.S. PATENT DOCUMENTS

| | | | | |
|---|---|---|---|---|
| 6,038,316 | A * | 3/2000 | Dwork et al. | 705/51 |
| 6,108,425 | A * | 8/2000 | Smith et al. | 380/277 |
| 6,285,761 | B1 * | 9/2001 | Patel et al. | 380/44 |
| 6,304,658 | B1 * | 10/2001 | Kocher et al. | 380/30 |
| 6,307,938 | B1 * | 10/2001 | Matyas et al. | 380/44 |
| 6,378,072 | B1 * | 4/2002 | Collins et al. | 713/187 |
| 6,381,699 | B2 * | 4/2002 | Kocher et al. | 713/172 |
| 6,490,357 | B1 * | 12/2002 | Rose | 380/265 |
| 6,748,410 | B1 * | 6/2004 | Gressel et al. | 708/491 |

FOREIGN PATENT DOCUMENTS

WO WO 98 52319 A 11/1998

OTHER PUBLICATIONS

Dimitrov V et al: "Two Algorithms for Modular Exponentiation Using Nonstandard Arithmetics" IEICE Transactions on Fundamentals of Electronics, Communications and Computer Sciences, JP, Inst. of Electr Info & Comm. Eng. Tokyo, vol. E78-A, No. 1 Jan. 1, 1995, pp. 82-87, XP000495124, ISSN: 0916-8508 * Paragraph 2.2.

Brickell E F et al: Fast Exponentiation with Precomputation (Extended Abstract) Advances in Cryptology-Eurocrypt, Intl Conf on the Theory and Appl. of Cryptographic Techniques, De Springer Verlag, May 24, 1992, pp. 200-207, XP000577415—*Paragraph 2*.

Kocher P C: Timing Attacks on Implementations of Diffie-Hellman, RSA DSS, and Other Systems, Proceedings of the Annual Int'l Cryptology Conf (Crypto), DE, Berlin Springer, vol. Conf 16, 1996, pp. 104-113, XP000626590, ISBN: 3-540-616512-1 *Paragraph 10*.

* cited by examiner

*Primary Examiner*—Kim Vu
*Assistant Examiner*—Leynna T. Ha
(74) *Attorney, Agent, or Firm*—Miles & Stockbridge P.C.; Edward J. Kondracki

(57) ABSTRACT

The invention concerns a method for protecting an electronic system implementing a cryptographic calculation process involving a modular exponentiation of a quantity (x), said modular exponentiation using a secret exponent (d), characterized in that said secret exponent is broken down into a plurality of k unpredictable values ($d_1, d_2, \ldots, d_k$), the sum of which is equal to said secret exponent.

7 Claims, 1 Drawing Sheet

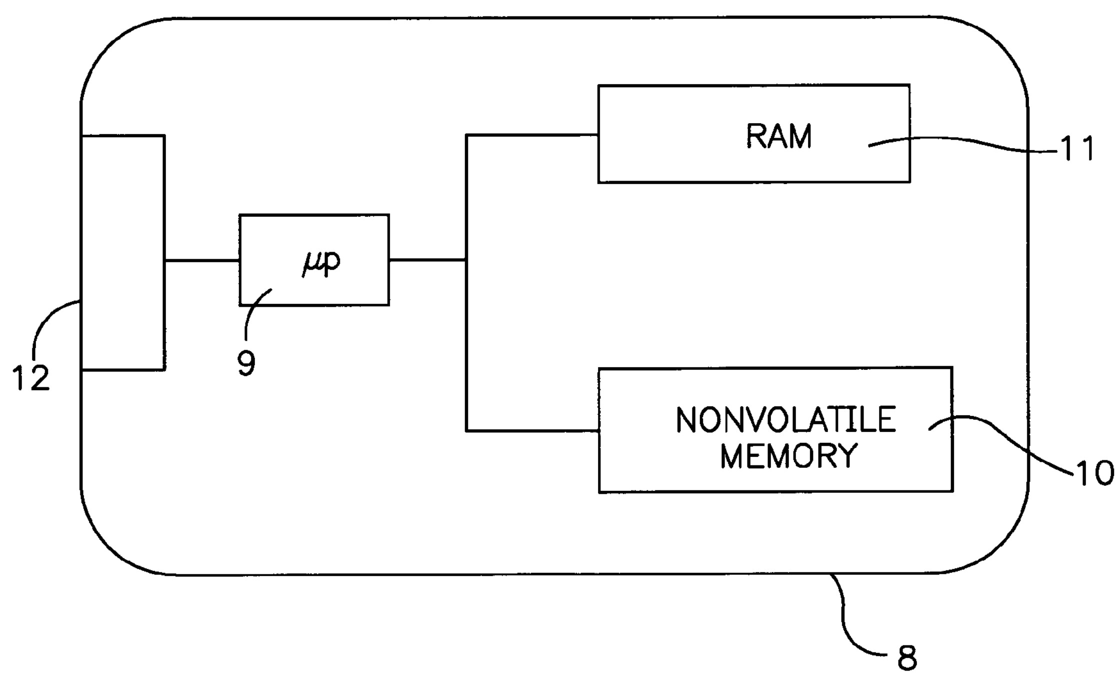
RAM
11
μp
9
12
NONVOLATILE
MEMORY
10
8

METHOD FOR PROTECTING AN ELECTRONIC SYSTEM WITH MODULAR EXPONENTIATION-BASED CRYPTOGRAPHY AGAINST ATTACKS BY PHYSICAL ANALYSIS

FIELD OF THE INVENTION

The present invention relates to a method for protecting an electronic system implementing an algorithm involving a modular exponentiation, in which the exponent is secret. More precisely, the purpose of the method is to create a version of such an algorithm that is not vulnerable to a certain type of physical attack—called Differential Power Analysis or High-Order Differential Power Analysis, (abbreviated DPA or HO-DPA)—which tries to obtain information on the secret key from a study of the electric power consumption of the electronic system during the execution of the calculation.

BACKGROUND OF THE INVENTION

The cryptographic algorithms considered herein use a secret key to calculate a piece of output information based on a piece of input information; this can involve an encryption, decryption, signature, signature verification, authentication, non-repudiation or key-exchange operation. They are constructed in such a way that a hacker, knowing the inputs and the outputs, cannot in practice deduce any information on the secret key itself.

We are therefore interested in a class larger than that traditionally designated by the expression secret key algorithms or symmetrical algorithms. In particular, everything described in the present patent application also applies to so-called public key or asymmetrical algorithms, which actually include two keys: one public, the other private and not divulged, the latter being the one targeted by the attacks described below.

Attacks of the Power Analysis type, developed by Paul Kocher and *Cryptographic Research* (see the document *Introduction to Differential Power Analysis and Related Attacks* by Paul Kocher, Joshua Jaffe, and Benjamin Jun, Cryptography Research, 870 Market St., Suite 1008, San Francisco, Calif. 94102; HTML edition of the document available at the URL address: http://www.cryptography-.com/dpa/technical/index.html) start with the observation that in reality the hacker can acquire information other than simply the input and output data during the execution of the calculation, such as for example the power consumption of the microcontroller or the electromagnetic radiation emitted by the circuit.

Differential power analysis is an attack that makes it possible to obtain information on the secret key contained in the electronic system, by performing a statistical analysis of the power consumption records, performed on a large number of calculations with this same key.

This attack does not require any knowledge of the individual power consumption of each instruction, or on the temporal position of each of these instructions. It applies in the same way assuming that the hacker knows some of the outputs of the algorithm and the corresponding consumption curves. It is based solely on the fundamental hypothesis according to which:

Fundamental hypothesis: There is an intermediate variable appearing during the calculation of the algorithm, such that the knowledge of a few key bits, in practice less than 32 bits, makes it possible to decide whether or not two inputs, respectively two outputs, give the same value for this variable.

The so-called high-order power analysis attacks are a generalization of the DPA attack described above. They can use several different sources of information: in addition to the consumption, they can use measurements of electromagnetic radiation, temperature, etc., performing statistical operations that are more sophisticated than the simple notion of an average, and intermediate variables that are less elementary than a simple bit or a simple byte. Nevertheless, they are based on exactly the same fundamental hypothesis as DPA.

The object of the method that is the subject of the present invention is to eliminate the risk of DPA or HO-DPA attacks on electronic systems with secret or private key cryptography involving modular exponentiation in which the exponent is secret.

Another object of the present invention is consequently to modify the cryptographic calculation process implemented by protected electronic cryptographic systems, in such a way that the aforementioned fundamental hypothesis is not longer verified, i.e. that there is no intermediate variable that depends on the consumption of a sub-system easily accessible by the secret or private key, attacks of the DPA or HO-DPA thus being rendered ineffective.

First example: the RSA algorithm

RSA is the most famous of the asymmetrical cryptographic algorithms. It was developed by Rivest, Shamir and Adleman in 1978. For a more detailed description of this algorithm, it may be useful to refer to the following document:

R. L. Rivest, A. Shamir, L. M. Adleman, *A Method for Obtaining Digital Signatures and Public-Key Cryptosystems*, Communications of the ACM, 21, No. 2, 1978, pp. 120–126, or to the following documents:

ISO/IEC 9594-8/ITU-T X.509, *Information Technology—Open systems Interconnection—The Directory: Authentication Framework;*

ANSI X9.31.1*, American National Standard, Public-Key Cryptography Using Reversible Algorithms for the Financial Services Industry,* 1993;

PKCS #1*, RSA Encryption Standard*, version 2, 1998, available at the following address: ftp://ftp.rsa.com/pub/pkcs/doc/pkcs-1v2.doc.

The RSA algorithm uses a whole number n that is the product of two large prime numbers p and q, and a whole number e, prime with ppcm(p−1, q−1), and such that e·±1 mod ppcmp−1, q−1). The whole numbers n and e constitute the public key. The public key calculation uses the function g of Z/nz in Z/nz defined by $g(x)=x^e$ mod n. The secret key calculation uses the function $g^{-1}(y)=y^d$ mod n, where d is the secret exponent (also called the secret or private key) defined by ed·1 mod ppcm(p−1, q-1).

Attacks of the DPA or HO-DPA type can pose a threat to the standard implementations of the RSA algorithm. In essence, the latter very often use the so called square and multiply principle to perform the calculation of $x^d$ mod n.

This principle consists of writing the breakdown $$d=b_{m-}\cdot 2^{m-1}+b_{m-2}\cdot 2^{m-2}+ \ldots +b_1\cdot 2^1+b_0 2^{\cdot 0}$$

of the secret exponent d in base 2, the performing the calculation in the following way:

1. z·1;

for i running from m-1 to 0 perform:

2. $z \cdot z^2$ mod n;

3. if $b_l$=1 then z·z×x mod n.

In this calculation, it is clear that among the successive values assumed by the variable z, the prime numbers depend on only a few bits of the secret key d. The fundamental hypothesis that makes the DPA attack possible is therefore fulfilled. It is thus possible to guess, for example, the 10 high-order bits of d by concentrating on the consumption measurements in the part of the algorithm that corresponds to i running from m−1 to m−10, which makes it possible to find the next ten bits of d, and so on. Eventually, all the bits of the secret exponent d are found.

A First Protection Method, and its Disadvantages

A conventional method (proposed by Ronald Rivest in 1995) for protecting the RSA algorithm against DPA type attacks consists of using a "blinding" principle. This uses the fact that:

$$x^d \bmod n=(x\times r^e)^d\times r_{-1} \bmod n$$

Thus, the calculation of $y=x^d$ mod n is broken down into four steps:

A random generator is used to obtain a value r;

We calculate: $u=x\times r^e$ mod n;

We calculate: $v=u^d$ mod n;

We calculate: $y=v\times r^{-1}$ mod n.

The disadvantage of this method is that it makes it necessary, for each calculation, to calculate the modular inverse $r^{-1}$ of the random value r, this operation generally being time-consuming (the duration of such a calculation is on the same order as that of a modular exponentiation such as $u^d$ mod n). Consequently, this new implementation (protected against DPA attacks) of the calculation of $x^d$ mod n takes about twice as long as the initial implementation (not protected against DPA attacks). In other words, this protection of RSA against DPA attacks increases the calculation time by approximately 100% (assuming that the public exponent e is very small, for example e=3; if the exponent e is larger, this calculation time is even longer).

A Second Method: The Method of the Present Invention

According to the invention, a method for protecting an electronic system implementing a cryptographic calculation process involving a modular exponentiation of a quantity (x), said modular exponentiation using a secret exponent (d), is characterized in that said secret exponent is broken down into a plurality of k unpredictable values ($d_1, d_2, \ldots, d_k$), the sum of which is equal to said secret exponent.

Advantageously, said values ($d_1, d_2, \ldots, d_k$), are obtained in the following way:

a) (k−1) values are obtained by means of a random generator;

b) the final value is obtained from the difference between the secret exponent and the (k−1) values.

Advantageously, the calculation of the modular exponentiation is performed in the following way:

a) for each of said k values, the quantity (x) is raised by an exponent comprising said value in order to obtain a result, a set of results thus being obtained;

b) a product of the results obtained in step a) is calculated.

Advantageously, at least one of said (k−1) values obtained by means of a random generator has a length greater than or equal to 64 bits.

Some of the details and advantages of the present invention will emerge from the following description of some preferred but non-limiting embodiments, in reference to the sole attached figure, which represents a smart card.

According to the invention, we use the fact that:

if $d=d_1+d_2$, then $x^d$ mod $n=x^{d_1}\times x^{d_2}$ mod n

Thus, the calculation of y=x mod n is broken down into five steps:

A random generator is used to obtain a value $d_1$;

We calculate: $d_2=d-d_1$;

We calculate: $u=x^{d_1}$ mod n;

We calculate: $v=x^{d_2}$ mod n;

We calculate: $y=u\times v$ mod n.

The advantage is that, this way, there is no modular inverse to calculate. In general, the calculation time of a modular exponentiation is proportional to the size of the exponent. Thus, if we let · be the ratio between the size of $d_1$ and the size of $d_2$, it is clear that the total calculation time in this new implementation (protected against DPA attacks) is about (1+· ) times the calculation time in the initial implementation (not protected against DPA attacks).

Note that, in order to obtain an unpredictable value $d_1$, it necessary for its size to be at least 64 bits.

The method thus described renders attacks of the DPA or HO-DPA type described above ineffective. In essence, in deciding whether or not two inputs (respectively two outputs) of the algorithm give the same value for an intermediate variable appearing during the calculation, it is no longer enough to know the key bits involved. It is also necessary to know the breakdown of the secret key d into k values $d_1, d_2, \ldots, d_k$ such that $d=d_1+d_2+\ldots+d_k$. Assuming that this breakdown is secret, and that at least one of the k values has a size of at least 64 bits, the hacker cannot predict the values of $d_1, \ldots, d_k$, and therefore the fundamental hypothesis that would make it possible to implement a DPA or HO-DPA type attack, is no longer verified.

EXAMPLES

1. If n has a length of 512 bits, by choosing to take a random value $d_1$ of 64 bits, we obtain ·=1/8, which means that this protection of RSA against DPA attacks increases the calculation time by about 12.5%.

2. If n has a length of 1024 bits, by choosing to take a random value $d_1$ of 64 bits, we obtain ·=1/16, which means that this protection of RSA against DPA attacks increases the calculation time by about 6.25%.

Second Example: the Rabin Algorithm

We will now consider the asymmetrical cryptographic algorithm developed by Rabin in 1979. For a more detailed description of this algorithm, it may be useful to refer to the following document:

M. O. Rabin, Digitized Signatures and Public-Key Functions as Intractable as Factorization, Technical Report LCS/TR-212, M.I.T. Laboratory for Computer Science, 1979.

The Rabin algorithm uses a whole number n that is the product of two large prime numbers p and q, which also verify the following two conditions:

p is congruent with 3 modulo 8;

q is congruent with 7 modulo 8.

The public key calculation uses the function g of Z/nZ in Z/nZ defined by $g(x)=x^2$ mod n. The secret key calculation uses the function $g^{-1}(y)=y^d$ mod n, where d is the secret exponent (also called the secret or private key) defined by d=((p−1)(q−1)/4+1)/2.

The function implemented by the secret key calculation being exactly the same as that used by the RSA algorithm, the same DPA or HO-DPA attacks are applicable and can pose the same threats to the Rabin algorithm.

Protecting the Algorithm

Since the function is exactly the same as the one in RSA, the protection method described in the RSA context is applied in the same way in the case of the Rabin algorithm. The increase in the calculation time caused by the application of this method is also the same as in the case of the RSA algorithm.

BRIEF DESCRIPTION OF THE DRAWING

FIG. 1 is a representation of a smart card.

The invention can be implemented in any electronic system performing a cryptographic calculation involving a modular exponentiation, including a smart card 8 as shown in FIG. 1. The chip includes information processing means 9, connected on one end to a nonvolatile memory 10 and a volatile working memory RAM 11, and connected on another end to means 12 for cooperating with an information processing device. The nonvolatile memory 10 can comprise a non-modifiable ROM part and a modifiable part constituted by an EPROM, an EEPROM or a RAM of the "flash" type, or FRAM, (the latter being a ferromagnetic RAM)), i.e., having the characteristics of an EEPROM but with access times identical to those of a standard RAM.

For the chip, it is possible to use, in particular, a self-programmable microprocessor with a nonvolatile memory, as described in U.S. Pat. No. 4,382,279 assigned to the assignee of the present invention. In a variant, the microprocessor of the chip is replaced, or at least supplemented, by logical circuits installed in a semiconductor chip. In essence, such circuits are capable of performing calculations, including authentication and signature calculations, as a result of hard-wired, rather than microprogrammed, electronics. In particular, they can be of the ASIC ("Application Specific Integrated Circuit") type. Advantageously, the chip is designed in monolithic form.

In the case of the utilization of such an electronic system, the invention consists in a method for protecting an electronic system comprising information processing means and information storage means, the method implementing a cryptographic calculation process involving a modular exponentiation of a quantity (x) stored in the information storage means, said modular exponentiation using a secret exponent (d) stored in the storage means, characterized in that, by means of said information processing means, said secret exponent read in said information storage means is broken down into a plurality of k unpredictable values ($d_1$, $d_2$, . . . , $d_k$), the sum of which is equal to said secret exponent, said k unpredictable values being stored in the information storage means.

Advantageously, said values ($d_1$, $d_2$, . . . , dk) are obtained in the following way:

a) (k−1) values are obtained by means of a random generator and stored in the information storage means;

b) the final value is obtained from the difference between the secret exponent and the (k−1) values, calculated by means of said information processing means.

Advantageously, the calculation of the modular exponentiation is performed in the following way:

a) for each of said k values, the quantity (x) is raised by an exponent comprising said value in order to obtain a result, a set of results thus being obtained;

b) a product of the results obtained in step a) is calculated.

Advantageously, at least one of said (k−1) values obtained by means of a random generator has a length greater than or equal to 64 bits.

While this invention has been described in conjunction with specific embodiments thereof, it is evident that many alternatives, modifications and variations will be apparent to those skilled in the art. Accordingly, the preferred embodiments of the invention as set forth herein, are intended to be illustrative, not limiting. Various changes may be made without departing from the true spirit and full scope of the invention as set forth herein and defined in the claims.

What is claimed is:

1. A method adapted to protect a smart card implementing a cryptographic process involving calculation of a modular exponentiation of a quantity (x), said modular exponentiation using a secret exponent (d), comprising breaking down said secret exponent (d) into unpredictable values (d1, d2, . . . , dk), wherein k is reater than 2, and at least one of said (k−1) values has a length at least equal to 64 bits, the sum of which is equal to said secret exponent (d) including:

deriving (k−1) unpredictable values (d1, d2, . . . , dk-1), using a random generator;

obtaining a final unpredictable value (dk) from the difference between the secret exponent (d) and the (k−1) unpredictable values (d1, d2, . . . , dk-1), creating k intermediate results by performing modular exponentiation on the quantity (x) using the k unpredictable values (d1, d2, . . . , dk−1, dk); and calculating a final results based on the k intermediate results, equal to the modular exponentiation of the quantity (x) using the secret exponent (d).

2. Utilizing the method according to claim 1 in the smart card comprising information processing means.

3. Utilizing the method according to claim 1 for:

protecting a cryptographic calculation process using the RSA algorithm.

4. Utilizing the method according to claim 1 for protecting a cryptographic calculation process using the Rabin algorithm.

5. A method adapted to protect a smart card implementing a cryptographic process involving calculation of a modular exponentiation of a quantity (x), said modular exponentiation using a secret exponent (d), comprising:

breaking down said secret exponent (d) into a plurality of k unpredictable values (d1, d2, . . . , dk), the sum of which is equal to said secret exponent; obtaining said unpredictable value (d1, d2, . . . , dk) by deriving (k−1) values by means of a random generator, wherein k is greater than 2, and at least one of said (k−1) values has a length at least equal to 64 bits, by raising the quantity (x) by an exponent comprising a final value and obtaining a set of results for each of said k values and calculating a product of the set of results and taking the difference between the secret exponent and the (k−1) values to derive the final value.

6. A smart card adapted to protect an electronic system comprising:

means for a implementing a cryptographic process involving calculation of a modular exponentiation of a quantity (x), said modular exponentiation using a secret exponent (d), comprising:

means for breaking down said secret exponent (d) into a plurality of k unpredictable values (d1, d2, . . . , dk), the sum of which is equal to said secret exponent, means for obtaining said unpredictable value (d1, d2, . . . , dk) by a random generator for deriving (k−1) values, wherein k is greater than 2, and at least one of said (k−1) values has a length at least equal to 64 bits, and means for taking the difference between the secret exponent and the (k−1) values to derive the final value.

7. A smart card according to claim 6, wherein calculation of the modular exponentiation is performed by:

a) raising the quantity (x) by an exponent comprising said value to obtain a set of results for each of said k values and b) calculating a product of the results obtained.

* * * * *

UNITED STATES PATENT AND TRADEMARK OFFICE

CERTIFICATE OF CORRECTION

PATENT NO. : 6,973,190 B1
DATED : December 6, 2005
INVENTOR(S) : Louis Goubin

It is certified that error appears in the above-identified patent and that said Letters Patent is hereby corrected as shown below:

Column 6,
Line 47, after “unpredictable,” replace “value” with -- values --.

Signed and Sealed this

Seventh Day of March, 2006

JON W. DUDAS
*Director of the United States Patent and Trademark Office*